(12) United States Patent
Ohshita (10) Patent No.: US 7,297,066 B2
(45) Date of Patent: Nov. 20, 2007

(54) RESIN JOINT BOOT

(75) Inventor: Takenori Ohshita, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 290 days.

(21) Appl. No.: 11/086,745

(22) Filed: Mar. 23, 2005

(65) Prior Publication Data

US 2006/0116213 A1    Jun. 1, 2006

(30) Foreign Application Priority Data

Nov. 29, 2004    (JP)    ............................. 2004-344935

(51) Int. Cl.
*F16D 3/84*    (2006.01)
(52) U.S. Cl. ..................................... 464/175
(58) Field of Classification Search ................ 464/173, 464/175; 277/634–637
See application file for complete search history.

(56) References Cited

U.S. PATENT DOCUMENTS

| 2,761,295 | A | * | 9/1956 | Davis .................. 464/175 X |
| 5,529,538 | A | | 6/1996 | Schulz et al. |
| 5,536,019 | A | * | 7/1996 | Bryant et al. ............... 277/634 |
| 6,547,669 | B1 | * | 4/2003 | Neviani ..................... 464/175 |
| 2004/0159976 | A1 | | 8/2004 | Sueoka et al. |
| 2006/0068925 | A1 | * | 3/2006 | Sueoka et al. ............. 464/175 |

FOREIGN PATENT DOCUMENTS

| EP | 0 702 173 A1 | 3/1996 |
| EP | 0 915 264 A2 | 5/1999 |
| FR | 2 767 880 A1 | 3/1999 |
| JP | 58-044523 | 9/1981 |
| JP | 4-124338 | 11/1992 |
| JP | 05-149446 A | 6/1993 |
| JP | 08-100823 | 4/1996 |
| JP | 9-96319 | 4/1997 |
| JP | 2550966 | 6/1997 |
| JP | 2002-286048 A | 10/2002 |
| JP | 2003-194220 | 7/2003 |
| JP | 2003-329057 | 11/2003 |
| JP | 2003-329057 A | 11/2003 |

OTHER PUBLICATIONS

Japanese Office Action dated Feb. 6, 2007, Application No. 2004-344935.

* cited by examiner

*Primary Examiner*—Greg Binda
(74) *Attorney, Agent, or Firm*—Westerman, Hattori, Daniels & Adrian, LLP.

(57) ABSTRACT

In a resin joint boot installed on an outer housing having a non-circular outer configuration as in a tripod constant velocity joint, assembling properties of its large-diameter attachment part are improved. The large-diameter attachment part of the joint boot assumes at its outer peripheral face a circular form in cross-section and has on its inner periphery plural lobe portions projecting radially inwardly provided in a circumferentially distributed manner. The large-diameter attachment part is formed, at least in circumferentially one place on its opening edge face, integrally with a tongue-like piece in a projecting manner. And on its inner peripheral face, a faying inner peripheral portion of a smaller diameter than that of the outer housing is provided, and at its opening extremity, an upset inner peripheral portion in a straight hole form of a larger diameter than that of the outer housing is provided on the inner peripheral face.

8 Claims, 8 Drawing Sheets

RESIN JOINT BOOT

BACKGROUND OF THE INVENTION

1. Field of the Invention

This invention relates to a bellows-shaped joint boot made of resin mainly used for a tripod type constant velocity joint, etc. of automobiles.

2. Description of Related Art

As one of constant velocity joints used for driveshafts or the like for vehicles, a tripod type of joint is known in the art.

Figure 9:
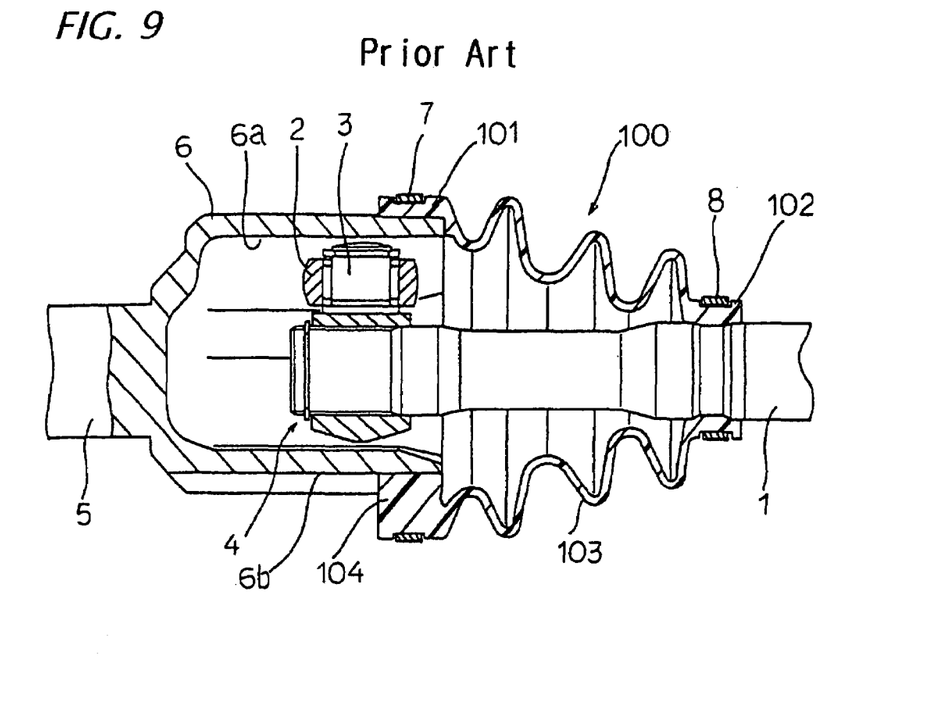
FIG. 9 is a sectional view showing a tripod type constant velocity joint fitted with a conventional resin joint boot.
Figure 10:
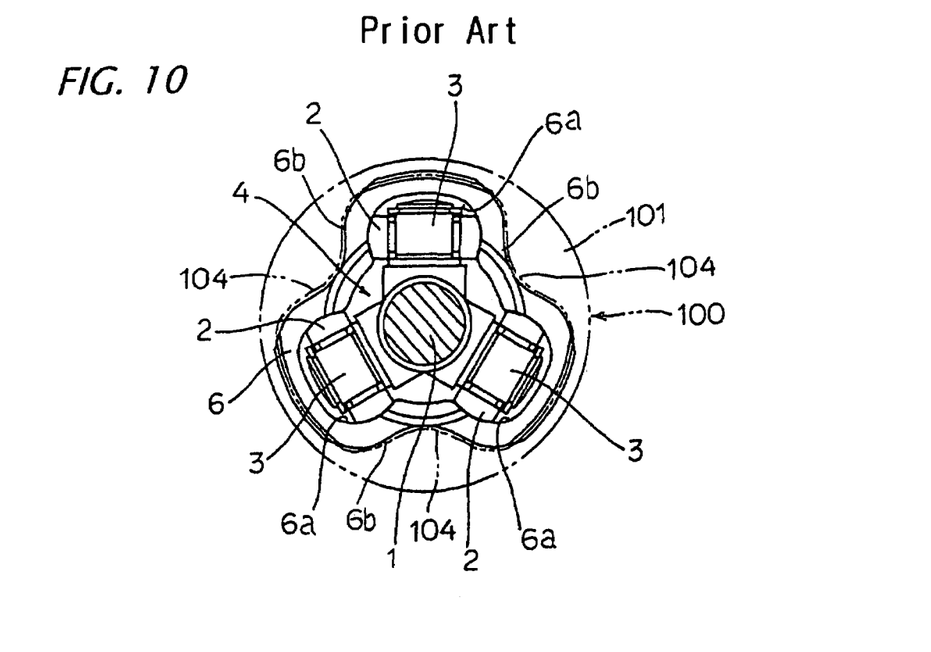
FIG. 10 is a side elevation of the constant velocity joint in FIG. 9.

A tripod type constant velocity joint is, as shown in FIGS. 9, 10 by way of example, comprised of a tripod 4 constructed so that three trunnions 3 having rollers 2 are provided to the one shaft 1 of an input side and an output side shafts in a manner projecting in normal direction to the axis, and an outer housing 6 provided at an end of the other shaft 5. The outer housing 6 has on its inner periphery three axially extending sliding grooves 6a corresponding to the tripod 4. The constant velocity joint is constructed so that the rollers 2 of the tripod 4 are mated with the sliding grooves 6a to be slidably movable in the axial direction, thereby enabling a running torque to be transmitted while enabling the angulation of both shafts 1, 5.

In such constant velocity joint as this, in order to prevent the ingress of dust or foreign substances within the joint or to retain grease contained therein, it is a general practice to mount a joint boot 100 assuming a bellows shape capable of proper extension and contraction and bending deformation so as to cover the part of the shaft 1 on the tripod 4 side from the outer housing 6. The axially one end of the joint boot 100 is formed as a large-diameter attachment part 101 that is attached and fitted to the outer periphery of the outer housing 6 and fixed by a clamping member 7 such as a ring-shaped band or the like, whereas the other end thereof is formed as a small-diameter attachment part 102 that is fixed to and around the outer periphery of the shaft 1 on the tripod 4 side by a clamping member 8, e.g. a ring-like band or the like, and both 101, 102 are connected integrally through a bellows part 103.

As shown in FIG. 10, the outer housing 6 is provided, on its external periphery, with three recessed portions 6b equidistantly disposed in the circumferential direction, corresponding to the arrangement of the sliding grooves 6a on its internal periphery, and accordingly, the external peripheral contour of the outer housing 6 is configured in a non-circular shape constituting a tongued and grooved form in the circumferential direction. Therefore the large-diameter attachment part 101 of the joint boot 100 to be attached to the outer housing 6 assumes, in its external peripheral configuration, a circular form in cross-section and, in its internal peripheral configuration, a non-circular form conforming to the external peripheral configuration of the outer housing 6. That is, on the internal periphery of the large-diameter attachment part 101 there are provided lobe portions 104 protruding inwardly in three circumferential places corresponding to the recessed portions 6b of the outer housing 6 (cf. EP Patent Publication 0915264 A2; JP Patent Application Publication 2003-329057 A).

SUMMARY OF THE INVENTION

In the aforementioned joint boot which has a plurality of the lobe portions on the inner periphery of the large-diameter attachment part, due to the presence of the plural lobe portions, the large-diameter attachment part is difficult to assemble with the outer housing, so that a problem of poor productivity arises. In particular, in the case where in order to enhance the durability the joint boot is fabricated from a resin material, the large-diameter attachment part is high in stiffness and consequently, it is hard to insert the outer housing within the large-diameter attachment part.

In the light of the problem described above, this invention has been accomplished, and it is an object of the invention to provide a resin-made joint boot to be attached to an outer housing having a non-circular outer peripheral configuration as in a tripod type constant velocity joint or the like, wherein the resin joint boot is remarkable in assembling properties of its large-diameter attachment part to the outer housing.

The resin joint boot, with which this invention is concerned, comprises a cylindrical large-diameter attachment part at one end thereof to be attached to an outer housing whose outer periphery is configured to have a plurality of recessed portions in the circumferential direction, a cylindrical small-diameter attachment part at the other end thereof to be attached to a shaft, and a bellows part connecting integrally both, the large-diameter attachment part assuming on its external peripheral surface a circular form in cross-section and being provided on its internal periphery with a plurality of lobe portions protruding radially inwardly in a distributed manner in the circumferential direction, wherein the large-diameter attachment part is provided, in at least one circumferential place of an opening edge face thereof, integrally with a tongue-like piece in a projecting manner.

According to this construction, because it is possible to assemble the large-diameter attachment part onto the outer housing while grabbing the tongue-like piece provided at the opening edge face of the large-diameter attachment part, it is easy to cover and envelop the large-diameter attachment part around the outer periphery of the outer housing and hence, assembling properties can be enhanced.

In the present invention, where the tongue-like piece is provided at the lobe portions of the large-diameter attachment part alongside of the external peripheral margin of the opening edge face, upon assembling of the large-diameter attachment part to the outer housing, the tongue-like piece is so readily grabbed that the assembling properties can be more enhanced.

In the invention, the large-diameter attachment part may be provided, on its inner peripheral face, with a faying inner peripheral portion of a smaller diameter than that of the outer housing so that the large-diameter attachment part can be fayed and externally fitted to the outer housing and simultaneously, the large-diameter attachment part may be provided, at its opening extremity on the inner peripheral face, with a straight hole-like upset inner peripheral portion of a larger diameter than that of the outer housing. By providing the faying inner peripheral portion of a smaller diameter than that of the outer housing in this manner so that the large-diameter attachment part can be fayed and externally fitted with the outer housing, it is possible to enhance the faying capability of the large-diameter attachment part to the outer housing. Further the upset inner peripheral portion provided at the opening extremity of the large-diameter attachment part acts as a guide guiding the outer housing when externally fitting the large-diameter attachment part on the outer housing and consequently, despite the structure of the large-diameter attachment part capable of faying and externally fitting with the outer housing, it is possible to facilitate external fitting of the large-diameter attachment part around the outer housing. Taken overall, the sealing properties at the large-diameter attachment part are remarkable, yet the assembling properties of the large-diameter attachment part to the outer housing are remarkable.

In this invention, alternatively, the large-diameter attachment part may be provided on the inner peripheral face with the faying inner peripheral portion of a smaller diameter than that of the outer housing so that it can be fayed and externally fitted to the outer housing and concurrently, the opening extremity of the large-diameter attachment part may be provided on its inner peripheral face with a tapered inner peripheral portion that assumes a tapered hole larger in diameter toward the opening extremity side and has an end of a larger diameter than that of the outer housing. Also in this case, due to the faying inner peripheral portion, the sealing properties at the large-diameter attachment part are remarkable. Further because of the tapered inner peripheral portion provided at the opening extremity of the large-diameter attachment part, the outer housing is easy to insert into the interior of the large-diameter attachment part, and consequently, the sealing properties at the large-diameter attachment part are remarkable, yet the assembling properties of the large-diameter attachment part to the outer housing are remarkable.

In this case, the tapered inner peripheral portion may be preset so that its axial dimension and radial dimension at the lobe portions are larger than its axial dimension and radial dimension at arc-like wall portions located between circumferentially adjacent lobe portions. Thereby when the large-diameter attachment part is assembled onto the outer housing, the arc-like wall portions, which are thin-walled and comparatively pliable, are firstly externally fitted to the outer housing, subsequently to which the lobe portions are externally fitted thereto, so that the force required at the initial stage of insertion can be diminished and a smooth insertion is feasible.

According to this invention thus constituted above, in the resin joint boot to be attached to an outer housing assuming a non-circular outer contour as in a tripod type constant velocity joint, it is possible to improve on assembling properties of the large-diameter attachment part to the outer housing.

BRIEF DESCRIPTION OF THE DRAWINGS

Preferred embodiments of the invention will be hereinafter described with reference to the accompanying drawings, in which.

DESCRIPTION OF THE PREFERRED EMBODIMENTS

Figure 1:
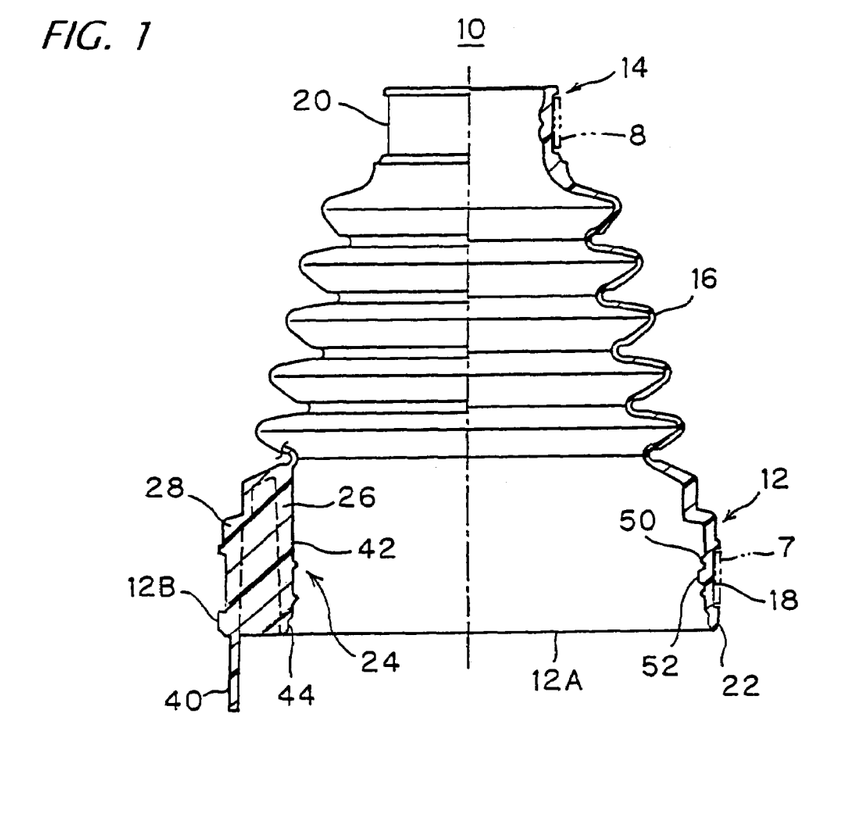
FIG. 1 is a half sectional, half side elevational view of a resin joint boot relating to a first embodiment of the invention.
Figure 2:
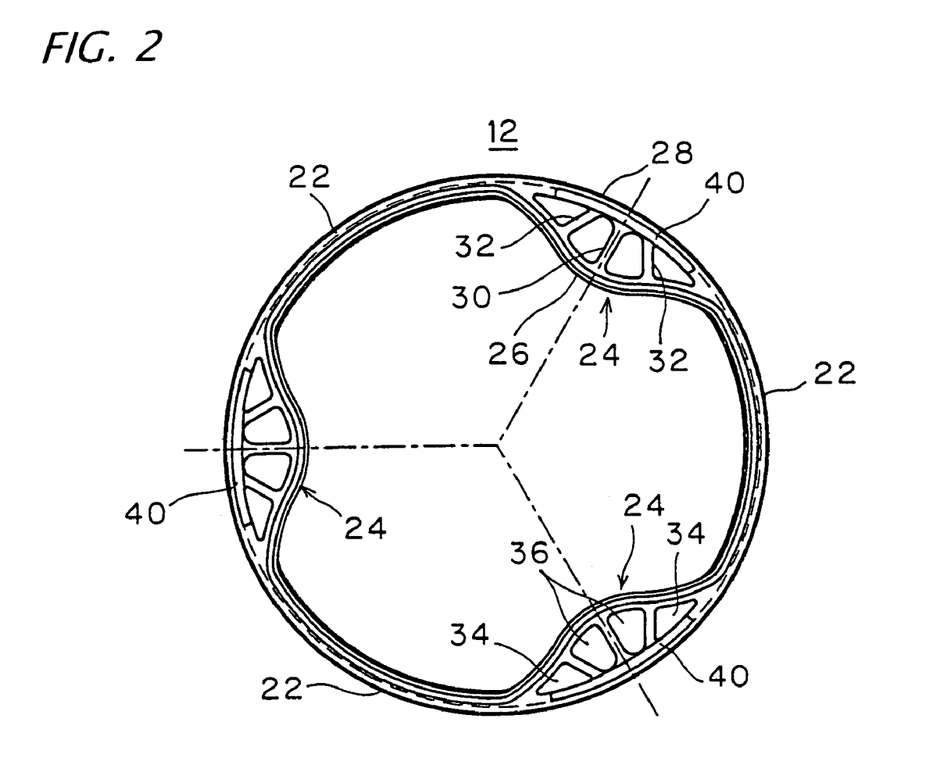
FIG. 2 is a front elevation of the joint boot in FIG. 1 on the large-diameter side.
Figure 3:
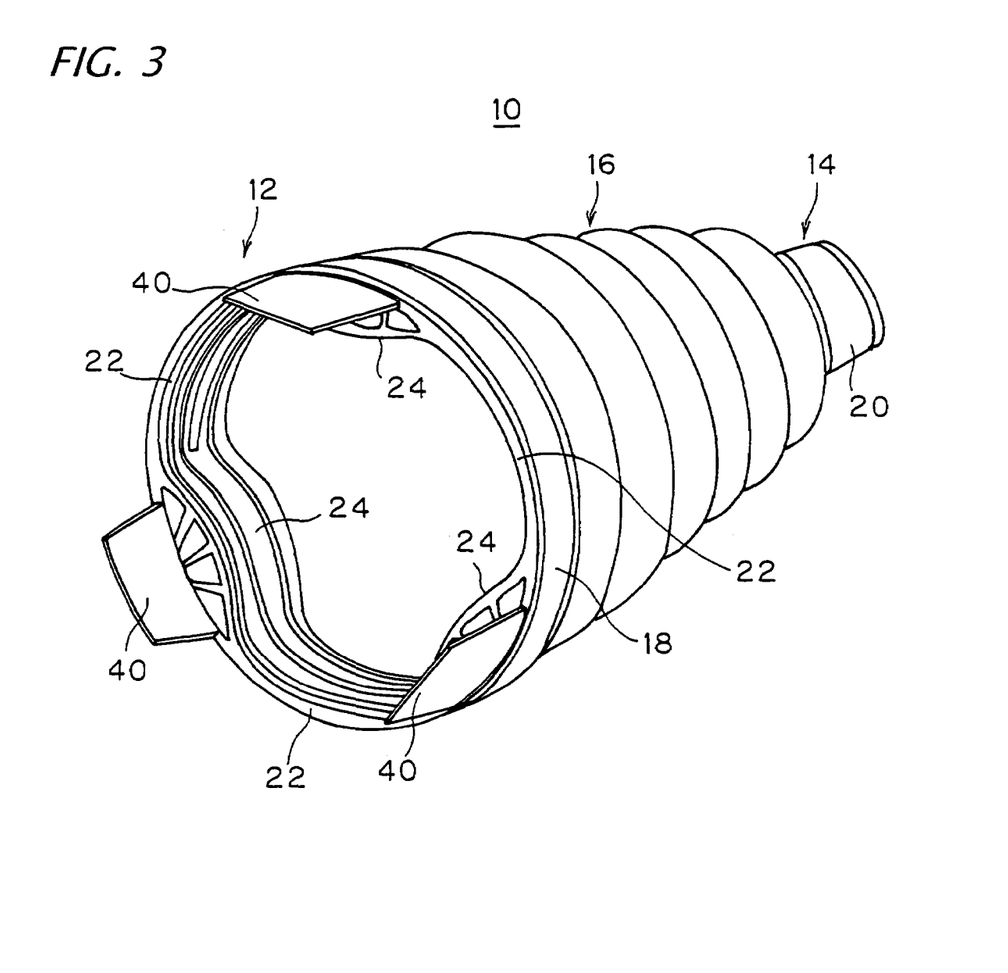
FIG. 3 is a perspective view of the joint boot above.

FIGS. 1 through 3 show a resin joint boot 10 relating to a first embodiment, which boot is to be installed on an automotive tripod type of constant velocity joint as shown in FIGS. 9 and 10.

The joint boot 10 is a boot made of thermoplastic elastomer resin, which comprises a large-diameter attachment part 12 at one end thereof, a small-diameter attachment part 14 at the other end thereof disposed concentrically in a spaced relation from the large-diameter attachment part 12, and a hollow bellows part 16 integrally connecting the large-diameter attachment parts 12 and the small-diameter attachment part 14 together, and integrally fabricated by a well-known molding method such as injection blow molding.

The large-diameter attachment part 12 assumes a short cylinder form to be externally fitted and secured to an outer housing 6 and is provided on its external peripheral face with a circumferentially extending recessed portion 18 for fixation for receiving thereon a ring-form clamping member 7. The small-diameter attachment part 14 assumes a short cylinder form to be externally fitted and secured to a shaft 1 on the tripod 4 side and is provided on its external peripheral surface with a circumferentially extending recessed portion 20 for fixation for receiving thereon a ring-like clamping member 8. The bellows part 16 is of a bellows body of a circular shape in cross-section having an aperture diameter difference at both ends and defines internally a grease filling space. The bellows part 16 is configured in a taper shape tapering progressively from the large-diameter attachment part 12 down to the small-diameter attachment part 14.

As illustrated in FIG. 2, the large-diameter attachment part 12 assumes, on its external peripheral face, a circular shape in cross-section. On the other hand, its internal periphery assumes a non-circular shape jutting inwardly in the form of a curved plane in a plurality of places (three places in this embodiment) in the circumferential direction so as to accommodate to the external peripheral configuration of the outer housing 6, in which a plurality of (three in this embodiment) recessed portions 6b are disposed equidistantly in the circumferential direction. Thereby the large-diameter attachment part 12 includes arc-like wall portions 22 to be disposed on the arc-like external peripheral faces of the outer housing 6 and lobe portions 24 to be mated with the recessed portions 6b of the outer housing 6, wherein the arc-like wall portions 22 and the lobe portions 24 are alternated in the circumferential direction.

The lobe portions 24 are each made up of, in this embodiment, an inner wall portion 26 jutting radially inwardly in a curved form and mating with the recessed portion 6b, an arc-like outer wall portion 28 constituting part of the external peripheral face of the large-diameter attachment part 12, a central strut wall 30 linking the inner wall portion 26 and the outer wall portion 28 at circumferentially centers of the both, and a pair of lateral strut walls 32, 32 linking both wall portions 26, 28 on laterally both sides of the central strut wall 30. Thereby at each of the lobe portions 24, four relief holes 34, 36, 36, 34 subsiding axially from an opening edge face 12A of the large-diameter attachment part 12 are thus defined to be juxtaposed in the circumferential direction.

The central strut wall 30 is a radially extending wall portion for supporting the inner wall portion 26 relative to the outer wall portion 28, and provided at a circumferentially center of the inner wall portion 26 most inwardly protruding. The each lateral strut wall 32 serves to support the inner wall portion 26 relative to the outer wall portion 28 and is formed to slant in a manner approaching the central strut wall 30 as it extends outwardly, not in parallel with the central strut wall 30. Due to this slanting, the lateral strut walls 32 are connected substantially vertically to the inner wall portion 26 and consequently, when the large-diameter attachment part 12 is clamped and anchored, a contact pressure the inner wall portions 26 exert on the outer housing 6 can be equalized in the circumferential direction and sealing properties can be enhanced. Further due to the slanting, the cross-sectional area of the relief holes 34 outside the lateral strut walls 32 can be ensured thereby to ensure demolding properties of cores upon molding.

Figure 6A:
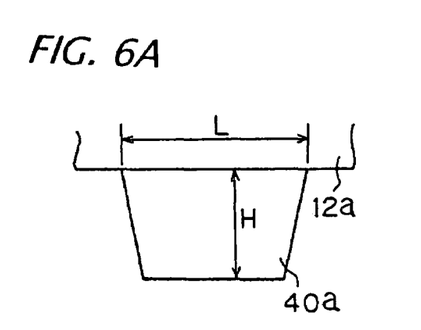
FIGS. 6A, 6B and 6C are plan views showing respective examples of a tongue-like piece.
Figure 6B:
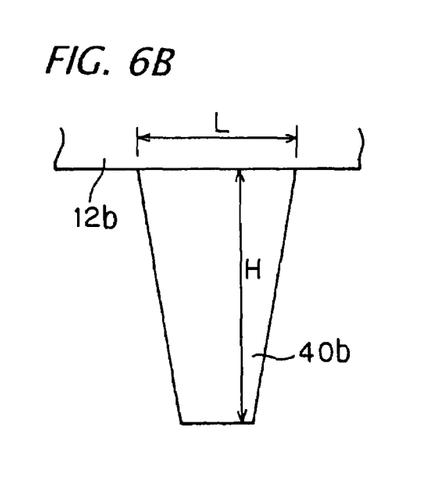
Figure 6C:
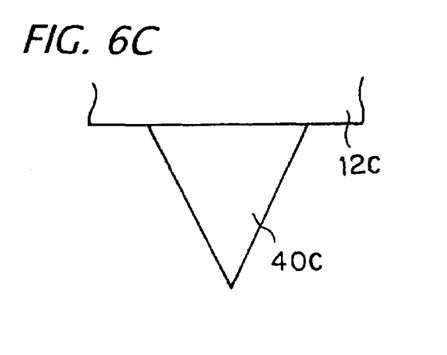

"At the opening edge face 12A of the large-diameter attachment part 12, namely at the edge face of the extremity opposite to the bellows part 16, one or more tongue-like piece 40 is integrally provided in a manner projecting axially outwardly of the large-diameter attachment part 12. In this embodiment as illustrated in FIGS. 2 and 3, one or more tongue-like piece 40 is disposed alongside of the external peripheral margin of the opening edge face 12A in respective circumferential places corresponding to the three lobe portions 24. More specifically, one or more tongue-like piece 40 is each extended out from the edge face of the outer wall portion 28 of the lobe portion 24 in parallel with the axial direction. The shape of one or more tongue-like piece 40 may be either a trapezoid having a smaller height H than a bottom side length L as in 40a of FIG. 6A or a trapezoid having a larger height H than the bottom side length L as in 40b of FIG. 6B, or a triangle as in 40c of FIG. 6C, and for that matter, may be a rectangle although not shown, and any other various shapes may be adopted."

Figures 4A, 4B:
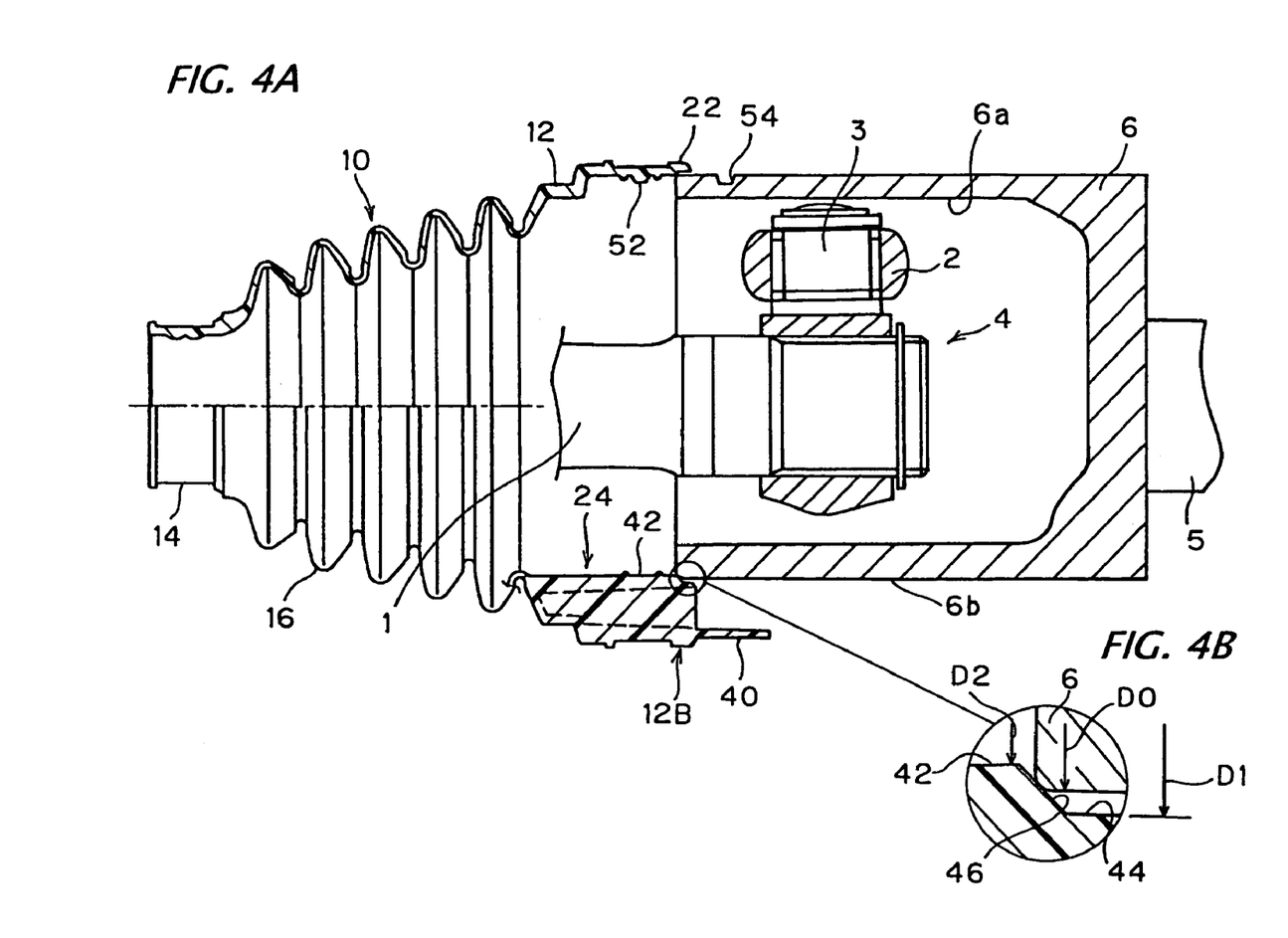
"FIG. 4A is a sectional view showing the midpoint in the process of the joint boot above being assembled to a constant velocity joint.
FIG. 4B is a magnification of the area where the large diameter attachment part of the joint boot attaches to the outer housing via the faying inner peripheral portion, the upset inner peripheral portion, and the tapered inner peripheral portion;"
Figure 5:
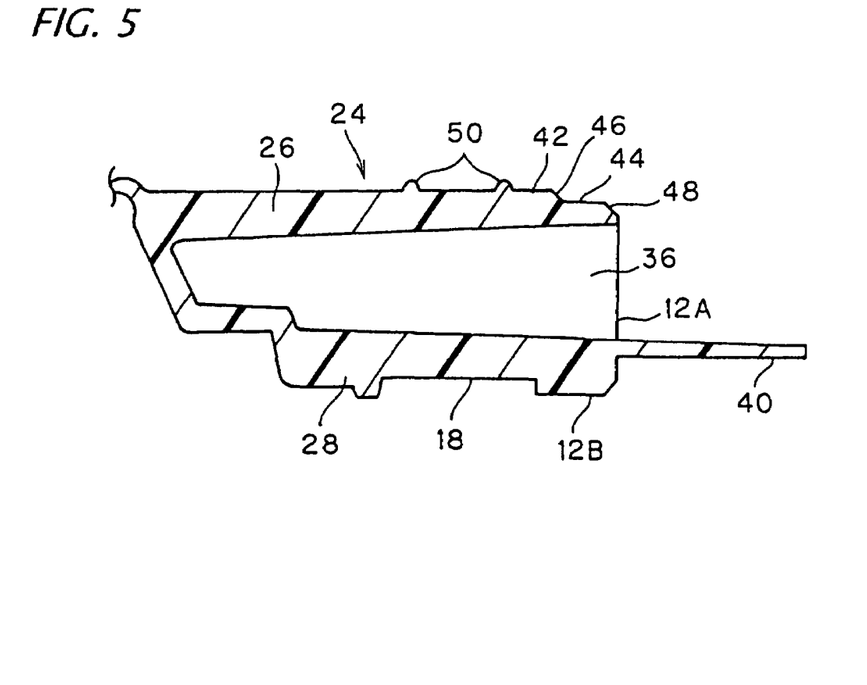
FIG. 5 is an enlarged sectional view of an essential part of the joint boot above.

As shown in FIGS. 4, 5, at the large-diameter attachment part 12, a faying inner peripheral portion 42 of a smaller diameter than that of the outer housing 6 is provided over a full circumference of the inner peripheral surface. That is, the faying inner peripheral portion 42 is set so that the profile of the inner peripheral face thereof may be smaller than the profile of the outer peripheral face of the outer housing 6. More specifically, at the inner periphery of the large-diameter attachment part 12, the lobe portions 24 capable of mating with the recessed portions 6b of the outer housing 6 are disposed in a distributed manner as stated above, and consequently, the diameter of the inner periphery varies in the circumferential direction. Therefore diameters at the inner peripheral face of the faying inner peripheral portion 42 are set to be smaller than diameters at corresponding places to the outer housing 6 in the full circumferential direction. For example, the diameter D2 at the lobe portions 24 is set to be smaller than the diameter D0 of the outer housing 6 at the recessed portions 6b, as illustrated in FIG. 4. Thus the large-diameter attachment part 12 is constructed to be capable of faying and externally fitting with the outer housing 6.

On the other hand, at the opening extremity 12B of the large-diameter attachment part 12, such an upset inner peripheral portion 44 in the form of a straight hole having a larger diameter than that of the outer housing 6 is provided over a full circumference of the inner peripheral face thereof that serves to guide the outer housing 6 when externally fitting the large-diameter attachment part 12 on the outer housing 6. The upset inner peripheral portion 44 is set so that the profile of its inner peripheral face is larger than the profile of the outer peripheral face of the outer housing 6, namely the diameters at the inner peripheral surface of the upset inner peripheral portion 44 are larger, over its full circumference, than diameters at corresponding places of the outer housing 6. For instance, the diameter D1 at the lobe portions 24 is set larger than the diameter D0 at the recessed portions 6b of the outer housing 6, as illustrated in FIG. 4.

As shown in FIG. 5, a boundary between the faying inner peripheral portion 42 and the upset inner peripheral portion 44 forms a tapered inner peripheral portion 46 assuming a tapered hole that is larger in diameter toward the opening edge face 12A, whereby it is made easier to insert the outer housing 6 into the faying inner peripheral portion 42. A boundary 48 between the upset inner peripheral portion 44 and the opening edge face 12A assumes also a tapered hole, making it easier to introduce the outer housing 6 into the upset inner peripheral portion 44.

Here, the reference numeral 50 designates a protruding streak for sealing provided on the inner peripheral surface of the large-diameter attachment part 12, and in this example, two ones are provided. The reference numeral 52 designates a positioning protrusion extending in the circumferential direction provided on the inner peripheral surface at each of the arc-like wall portions 22 of the large-diameter attachment part 12. The positioning protrusion 52 is mated with a groove 54 provided on the outer peripheral surface of the outer housing 6, whereby positioning of the large-diameter attachment part 12 in the axial direction is made.

When the resin joint boot 10 thus constructed above will be assembled with a constant velocity joint, the large-diameter attachment part 12 is externally fitted onto the outer housing 6 and fixed thereto by fastening the clamping member 7 to the recessed portion 18 for fixation on the outer periphery of the outer housing while the small-diameter attachment part 14 is externally fitted to the shaft 1 and secured thereto by fastening the clamping member 8 to the recessed portion 20 for fixation on the outer periphery thereof.

In externally fitting the large-diameter attachment part 12 to the outer housing 6, because the tongue-like pieces 40 are provided on the opening edge face 12A side of the large-diameter attachment part 12, by holding (grabbing) the tongue-like pieces 40 to pull them (accordingly, together with the large-diameter attachment part), it is possible to assemble the large-diameter attachment part 12 with the outer housing 6. Therefore, it is easy to cover the large-diameter attachment part 12 over the outer periphery of the outer housing 6 and consequently, it is possible to enhance the assembling properties. In particular, in this embodiment, since the tongue-like pieces 40 are disposed alongside of the outer wall portions 28 of the lobe portions 24, the tongue-like pieces 40 are situated in a spaced relation to the outer peripheral face of the outer housing 6 as shown in FIG. 4, so that the tongue-like pieces 40 are easy to grab, whereby the assembling properties can be more enhanced.

Further in externally fitting the large-diameter attachment part 12 to the outer housing 6, the upset inner peripheral portion 44 provided on the opening extremity 12B of the large-diameter attachment part 12 serves to guide the outer housing 6 as shown in FIG. 4, so that it is easy to externally fit the large-diameter attachment part 12 on the outer housing 6.

And once that the large-diameter attachment part 12 is externally fitted, due to the faying inner peripheral portion 42, the large-diameter attachment part 12 is mated in a faying state with the outer housing 6. Therefore the assembling properties of the large-diameter attachment part 12 to the outer housing 6 are excellent, and yet the sealing properties at the large-diameter attachment part 12 are excellent, too.

Now the resin joint boot pertaining to a second embodiment of the invention will be described with reference to FIGS. 7 and 8A, 8B. In the second embodiment, the arrangement of the tongue-like pieces 40 is different from that in the first embodiment. That is, in the second embodiment, the tongue-like pieces 40 are not disposed at the lobe portions 24, but at three arc-like wall portions 22 in their corresponding circumferential parts, namely they are formed to project axially outwardly from the opening edge face 12A at the arc-like wall portions 22 of the large-diameter attachment part 12. In this case, in order to make it easy to manipulate the tongue-like pieces 40 on the outer housing 6, the tongue-like pieces 40 are provided at their tip ends each with a projecting lug 56 that projects radially outwardly as shown in FIG. 8A. The tongue-like pieces 40 may be provided in any position in a variety of circumferential positions on the opening edge face 12A of the large-diameter attachment part 12, not solely in the circumferential positions corresponding to the lobe portions 24. Further the number of the tongue-like piece 40 to form is not limited to three as in these embodiments, but, for example, may be only one.

"The second embodiment is further different from the first embodiment in the following respect. That is, in the second embodiment, the upset inner peripheral portion 44 described above is not provided, but a tapered inner peripheral portion 58 assuming a tapered hole larger in diameter toward the opening edge face 12A' is formed on the opening extremity 12B' of the large-diameter attachment part 12' over a full circumference of the inner peripheral face thereof so as to extend up to the opening edge face 12A'. As illustrated in FIG. 8B, the tapered inner peripheral portion 58 has an edge (end) 58A larger in diameter than that of the outer housing 6, namely the diameter D3 at the edge 58A of the tapered inner peripheral portion 58 is set to be larger than the diameter D0 at a corresponding place of the outer housing 6."

"The tapered inner peripheral portion 58 is set so that an axial dimension X1 and a radial dimension Y1 in circumferential portions corresponding to the lobe portions 24' are respectively larger than an axial dimension X2 and a radial dimension Y2 in circumferential portions corresponding to the arc-like wall portions 22 (X1>X2, Y1>Y2). More specifically, as shown in FIG. 8B, the radial dimension Y1 of the tapered inner peripheral portion 58 is set to be larger than the thickness of the inner wall portion 26' in a circumferentially central part of the lobe portion 24' and approximately a half a radial dimension Z of the lobe portions 24'. Further the radial dimension Z of the lobe portions 24' varies in the circumferential direction, according to which as the radial dimension Z of the lobe portions 24' is smaller, the aforesaid dimensions X1 and Y1 of the tapered inner peripheral portion 58 are also set to be smaller proportionally."

"By setting the tapered inner peripheral portion 58 to be larger at the lobe portions 24' in this manner, when assembling the large-diameter attachment part 12' with the outer housing 6, the arc-like wall portions 22 which are thin-walled and relatively pliable are firstly put into abutment on the edge face of the outer housing 6 to be externally fitted thereto, and thereafter the lobe portions 24' are put into abutment on the edge face of the outer housing 6 to be externally fitted. Because of that, it is possible to reduce a force required at the beginning of the insertion, and a smooth insertion is thus possible."

Figure 7:
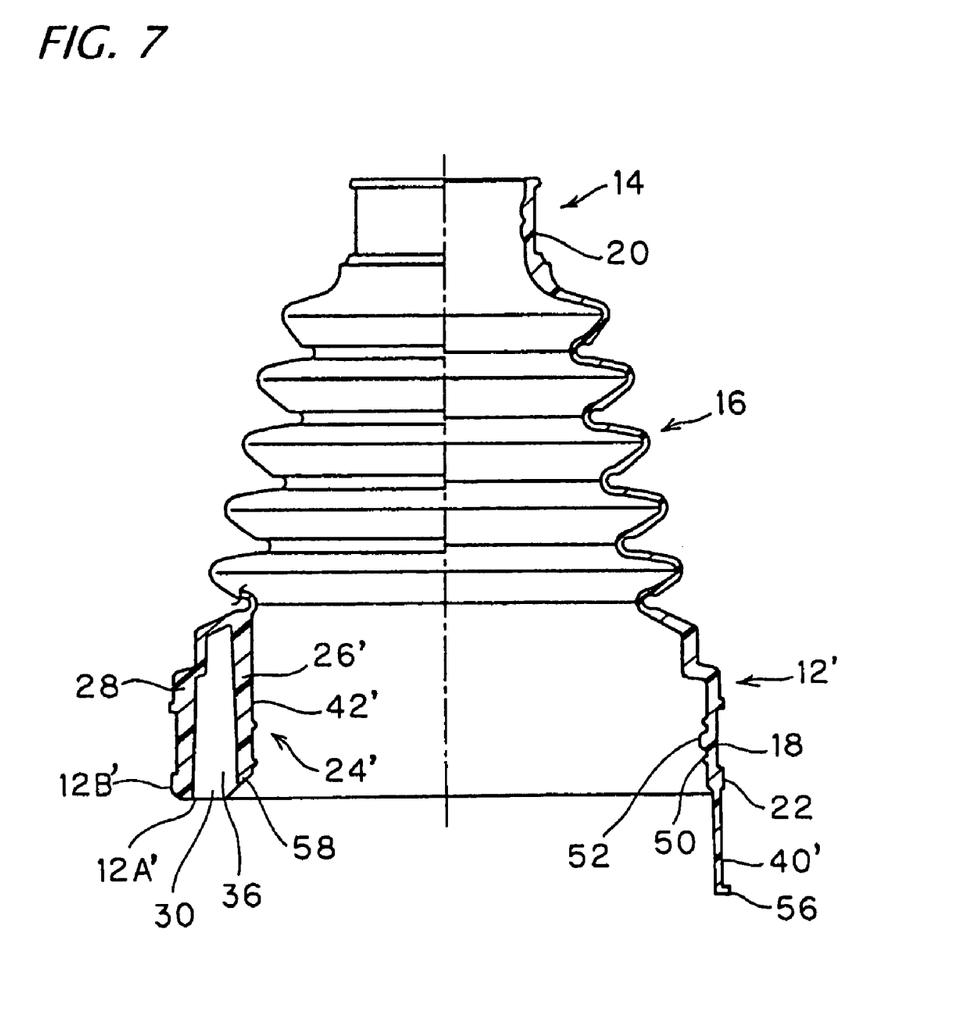
FIG. 7 is a half sectional, half side elevational view of a resin joint boot relating to a second embodiment of the invention.
Figure 8A:
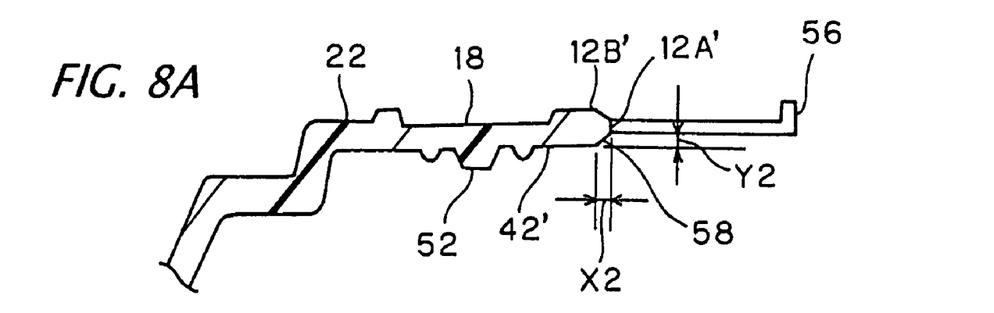
FIG. 8A and FIG. 8B are enlarged sectional views of the joint boot in FIG. 7 at an arc-like wall portion and a lobe portion, respectively.
Figure 8B:
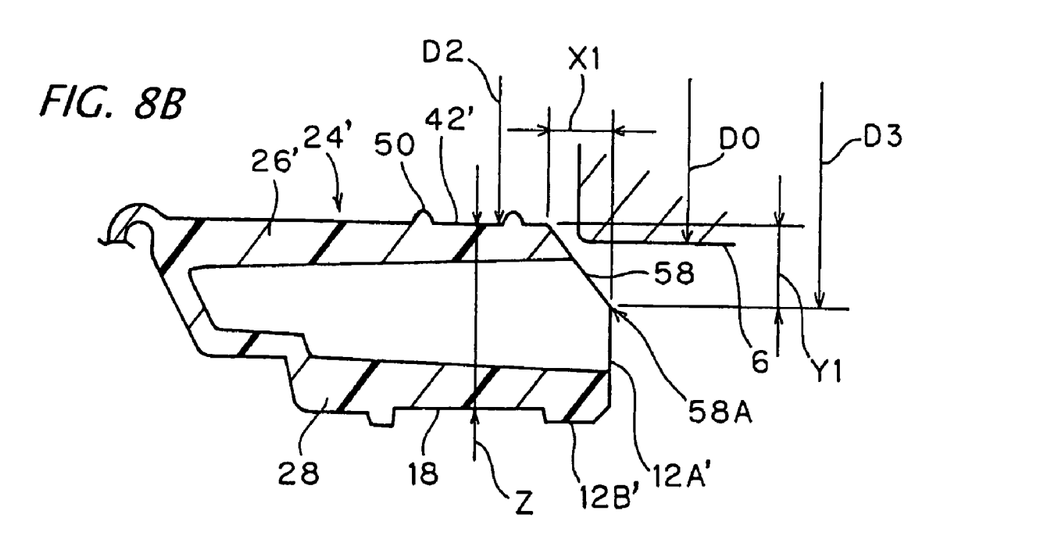

"As shown in FIGS. 7, 8A, and 8B at the large-diameter attachment part 12', a faying inner peripheral portion 42' of a smaller diameter than that of the outer housing 6 is provided over a full circumference of the inner peripheral surface. That is, the faying inner peripheral portion 42' is set so that the profile of the inner peripheral face thereof may be smaller than the profile of the outer peripheral face of the outer housing 6. Therefore diameters at the inner peripheral face of the faying inner peripheral portion 42' are set to be smaller than diameters at corresponding places to the outer housing 6 in the full circumferential direction. In the second embodiment, since the other construction and effects achieved are similar to those of the first embodiment, like parts to the first embodiment are designated by like reference characters, but including the affixation of a prime, so that description of them will be omitted."

The resin-made joint boot of this invention is excellent in assembling properties of the large-diameter attachment part to the outer housing, and consequently, can be utilized advantageously as a joint boot used mainly for automotive tripod type of constant velocity joints.

The invention claimed is:

1. A resin joint boot comprising:
   a cylindrical large-diameter attachment part at one end thereof to be attached to an outer housing whose outer peripheral contour is configured with a plurality of recessed portions in the circumferential direction;
   a cylindrical small-diameter attachment part at the other end thereof to be attached to a shaft;
   and a bellows part interconnecting integrally both,
   the large-diameter attachment part assuming at its outer peripheral face a circular form in cross-section, being provided, on its external peripheral face, with a circumferentially extending recessed portion for fixation for receiving thereon a ring-form clamping member and being provided, at its inner periphery, with a plurality of lobe portions protruding inward radially in a distributed manner in the circumferential direction;
   wherein the lobe portions are each made up of an inner wall portion jutting inward radially in a curved form and mating with the recessed portion, an arc-like outer wall portion constituting part of the external peripheral face of the large-diameter attachment part, and a strut wall supporting the inner wall portion relative to the outer wall portion;
   a tongue-like piece in a manner projecting outward axially is integrally provided on the large-diameter attachment part, at an opening edge face thereof, which is located on the axial outer side and outside of the recessed portion for fixation, and
   the tongue-like piece is disposed alongside of an external peripheral margin of the opening edge face at an edge face of the outer wall portion of at least one of lobe portions.

2. The resin joint boot as set forth in claim 1, wherein the tongue-like piece is provided alongside of an outer peripheral margin of said opening edge face at each of the lobe portions of the large-diameter attachment part.

3. The resin joint boot as set forth in claim 2, wherein the large-diameter attachment part is provided, at its inner peripheral face, with a faying inner peripheral portion of a smaller diameter than that of the outer housing so that the large-diameter attachment part can be fayed and externally fitted to the outer housing;

and the large-diameter attachment part is provided, at its opening extremity on the inner peripheral face, with a straight hole-shaped upset inner peripheral part having a larger diameter than that of the outer housing.

4. The resin joint boot as set forth in claim 2, wherein the large-diameter attachment part is provided at its inner peripheral face with a faying inner peripheral portion of a smaller diameter than that of the outer housing so that the large-diameter attachment part can be fayed and externally fitted to the outer housing;

and the large-diameter attachment part is provided, at its opening extremity on the inner peripheral face, with a tapered inner peripheral portion assuming a tapered hole larger in diameter toward the opening extremity and having an end of a larger diameter than that of the outer housing.

5. The resin joint boot as set forth in claim 4, wherein the tapered inner peripheral portion is preset so that its axial dimension and radial dimension at the lobe portions are respectively larger than its axial dimension and radial dimension at arc-like wall portions each located between the lobe portions being circumferentially adjacent.

6. The resin joint boot as set forth in claim 1, wherein the large-diameter attachment part is provided, at its inner peripheral face, with a faying inner peripheral portion of a smaller diameter than that of the outer housing so that the large-diameter attachment part can be fayed and externally fitted to the outer housing;

and the large-diameter attachment part is provided, at its opening extremity on the inner peripheral face, with a straight hole-shaped upset inner peripheral portion having a larger diameter than that of the outer housing.

7. The resin joint boot as set forth in claim 1, wherein the large-diameter attachment part is provided at its inner peripheral face with a faying inner peripheral portion of a smaller diameter than that of the outer housing so that the large-diameter attachment part can be fayed and externally fitted to the outer housing;

and the large-diameter attachment part is provided, at its opening extremity on the inner peripheral face, with a tapered inner peripheral portion assuming a tapered hole larger in diameter toward the opening extremity and having an end of a larger diameter than that of the outer housing.

8. The resin joint boot as set forth in claim 7, wherein the tapered inner peripheral portion is preset so that its axial dimension and radial dimension at the lobe portions are respectively larger than its axial dimension and radial dimension at arc-like wall portions each located between the lobe portions being circumferentially adjacent.

* * * * *